United States Patent
Thompson

(10) Patent No.: US 7,221,319 B2
(45) Date of Patent: May 22, 2007

(54) MOBILE SATELLITE RECEIVER SYSTEM

(75) Inventor: Charles D. Thompson, Buda, TX (US)

(73) Assignee: Silicon Laboratories Inc., Austin, TX (US)

( * ) Notice: Subject to any disclaimer, the term of this patent is extended or adjusted under 35 U.S.C. 154(b) by 168 days.

(21) Appl. No.: 11/000,696

(22) Filed: Dec. 1, 2004

(65) Prior Publication Data

US 2006/0114156 A1  Jun. 1, 2006

(51) Int. Cl.
*G01S 5/02* (2006.01)
*H04B 1/06* (2006.01)

(52) U.S. Cl. .................................. 342/417; 455/277.1

(58) Field of Classification Search ................ 342/372, 342/374, 417, 434, 357.17; 455/3.02, 277.1
See application file for complete search history.

(56) References Cited

U.S. PATENT DOCUMENTS

| | | | |
|---|---|---|---|
| 6,640,085 B1 | 10/2003 | Chatzipetros et al. | 455/3.02 |
| 6,724,827 B1 | 4/2004 | Patsiokas et al. | 375/259 |
| 2006/0046639 A1* | 3/2006 | Walker et al. | 455/3.02 |

* cited by examiner

*Primary Examiner*—Dao Phan
(74) *Attorney, Agent, or Firm*—Trop, Pruner & Hu, P.C.

(57) ABSTRACT

A system includes a first antenna that is located on one side of a motor vehicle and a second antenna that is located on another side of the motor vehicle. The system includes a controller, a switch and a receiver. In response to a heading of the motor vehicle, the controller selectively couples the receiver to one of the first antenna and the second antenna.

33 Claims, 9 Drawing Sheets

MOBILE SATELLITE RECEIVER SYSTEM

BACKGROUND

The invention generally relates to a mobile satellite receiver system.

Subscriber-based satellite radio is an option for motor vehicles, which is ever-increasing in popularity. A typical equipment package for mobile satellite radio includes an antenna and a satellite radio receiver that are connected together by an antenna feedline. The antenna produces a radio frequency signal in response to electromagnetic radiation that is received from a geosynchronous satellite.

Multipath and reflection effects typically affect the quality of the signal that is received in the satellite radio receiver. Therefore, a conventional satellite radio receiver may perform complete demodulation of the received RF signal for purposes of estimating a carrier-to-noise (C/N) ratio. From this estimation, the receiver interprets the received RF signal to recover the audio signal. The complete demodulation of the received RF signal for C/N estimation typically increases the cost of the satellite receiver.

Thus, there is a continuing need for a better system and/or technique to receive a signal in a mobile satellite receiver system.

SUMMARY

In an embodiment of the invention, a technique includes selectively coupling a receiver to an antenna in response to a heading of a vehicle.

In another embodiment of the invention, a computer accessible storage medium stores instructions to, when executed, cause a processor-based system to operate a switch to selectively couple an antenna to a receiver in response to a heading of a vehicle.

In another embodiment of the invention, a technique includes determining a heading of a motor vehicle. The technique includes in response to the heading, selectively coupling a receiver to one of a first antenna that is located on one side of the motor vehicle and a second antenna that is located on another side of the motor vehicle.

In another embodiment of the invention, a receiver includes a switch and a controller. The controller operates the switch to selectively couple the receiver to an antenna in response to a heading of a vehicle.

In yet another embodiment of the invention, a system includes a first antenna, a second antenna, a switch, a satellite receiver and a controller. The first antenna is located on a motor vehicle and is adapted to receive a satellite signal. The second antenna is located on the motor vehicle and is adapted to receive the satellite signal. The satellite receiver is adapted to generate an audio signal in response to the satellite signal. The controller, in response to a heading of the motor vehicle, selectively couples the receiver to one of the first antenna and the second antenna.

Advantages and other features of the invention will become apparent from the following description, drawing and claims.

DETAILED DESCRIPTION

Figure 1:
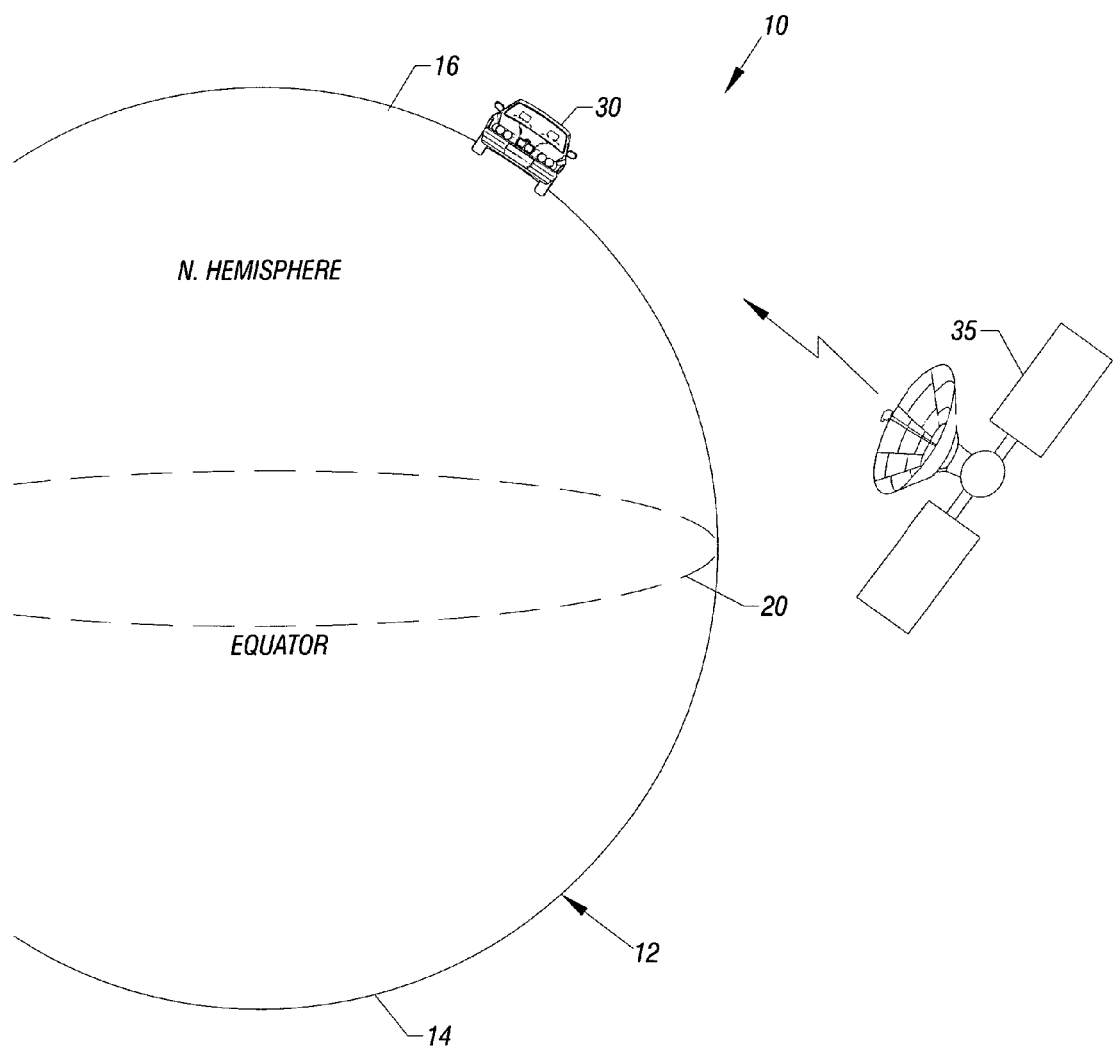
FIGS. 1, 4 and 5 are schematic diagrams of environments in which a geosynchronous satellite transmits a signal to a mobile satellite receiver according to an embodiment of the invention.

FIG. 1 depicts an environment 10 in which a geosynchronous satellite 35 transmits a signal to a mobile satellite receiver system (a satellite radio receiver system, for example) that is installed in a motor vehicle 30. Embodiments of the invention described herein recognize that the reception of an RF signal by the satellite receiver system 10 is affected by the direction, or heading, of the motor vehicle 30. For example, the motor vehicle 30, as depicted in FIG. 1, has a West heading and is located on the northern hemisphere 16 of the Earth 12. Furthermore, the satellite 35 is located near the equatorial plane 20 of the Earth 12. Due to this relationship, the driver side (assuming the driver sits on the left side of the vehicle when looking out of the front windshield of the vehicle) of the motor vehicle 30 is facing the satellite 35, while the passenger side of the motor vehicle 30 is facing away from the satellite 35. Conversely, when the vehicle 30 is heading East on the northern hemisphere 16 (not depicted in FIG. 1), the passenger side of the motor vehicle 30 faces the satellite 35, and the driver side of the motor vehicle faces away from the satellite 35. This relationship between the heading of the motor vehicle 30 and the satellite 35 may affect the reception by the satellite receiver system if not for the features that are further described herein.

Figure 2:
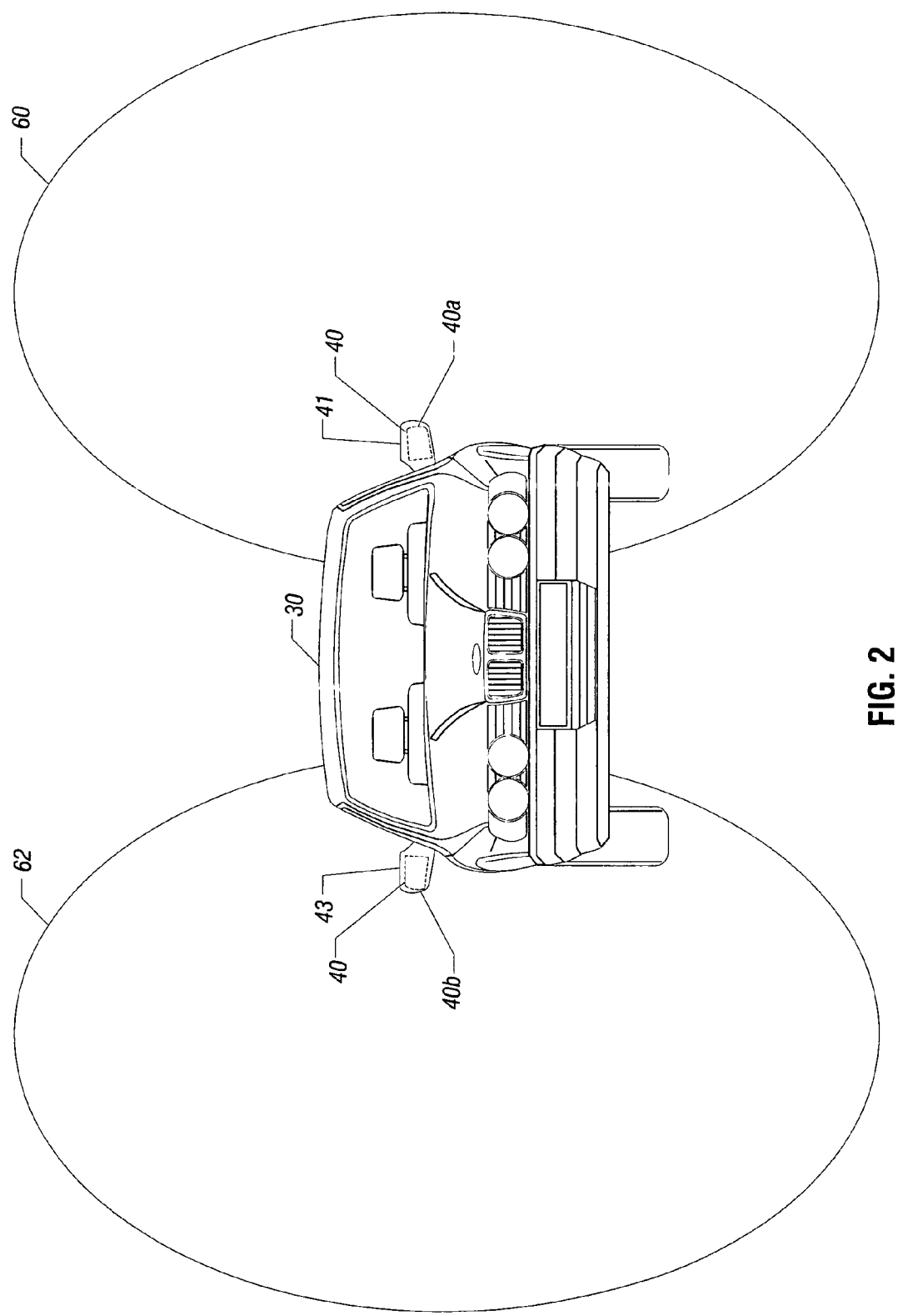
FIG. 2 is a front view of a motor vehicle illustrating antenna gain patterns according to an embodiment of the invention.

Referring to FIG. 2, more specifically, in accordance with some embodiments of the invention, the motor vehicle 30 includes multiple antennas 40 (such as antennas 40*a* and 40*b*, depicted as examples) that are mounted on the motor vehicle 30 for purposes of potentially receiving a satellite signal from the satellite 35 (see FIG. 1). More particularly, in some embodiments of the invention, the antenna 40*a* may be mounted in a sideview mirror housing 41 that is located on the driver side of the motor vehicle 30, and the antenna 40*b* may be mounted in a sideview mirror housing 43 that is located on the passenger side of the motor vehicle 30.

Figure 3:
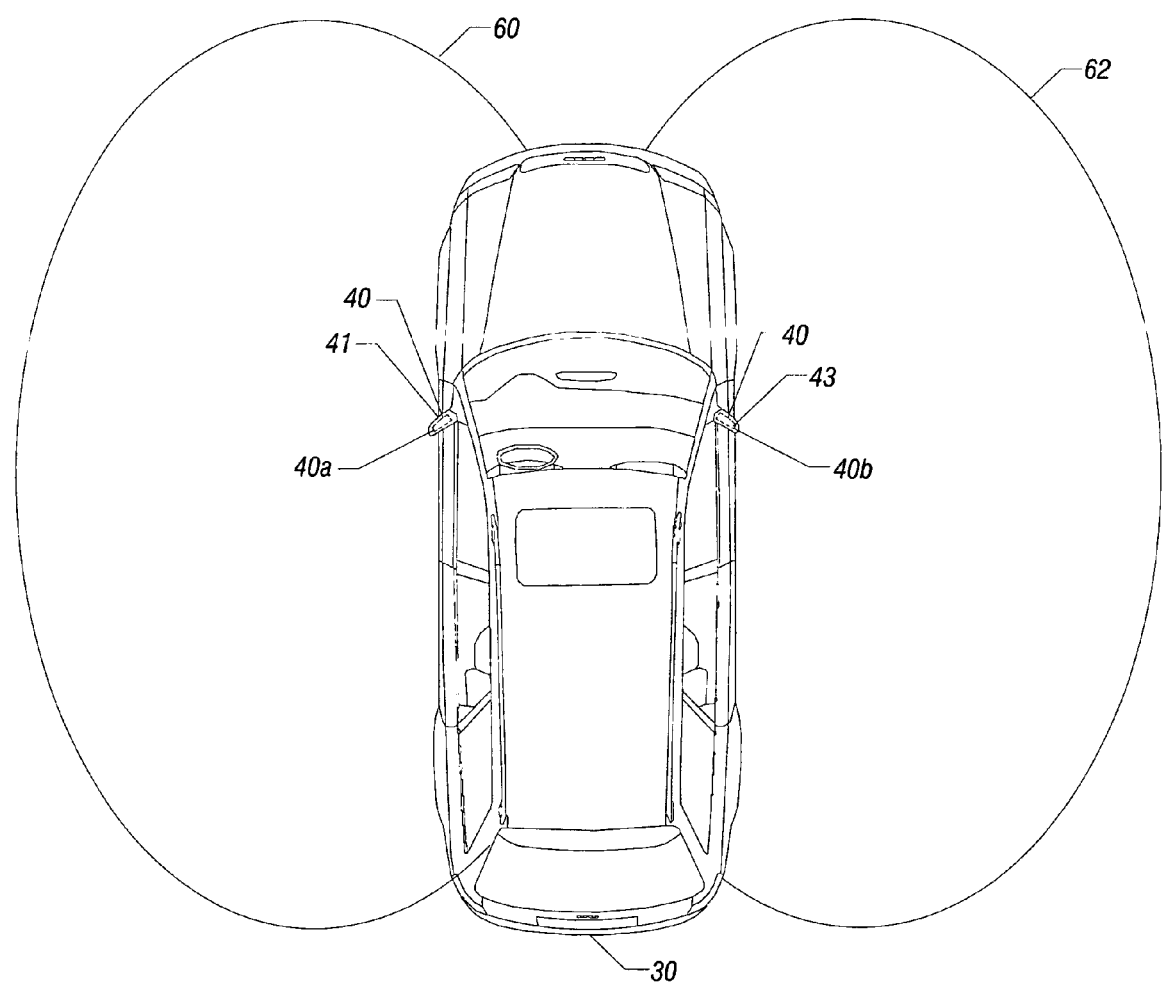
FIG. 3 is a top view of the motor vehicle depicting antenna gain patterns according to an embodiment of the invention.

The antennas 40*a* and 40*b* are directional in nature in that each of the antennas 40*a* and 40*b* has a three-dimensional antenna gain pattern that affects the reception of the satellite signal by the antenna 40*a*, 40*b* depending on the heading of the motor vehicle 30. FIG. 2 depicts a front view of the motor vehicle 30, a view that illustrates a gain pattern 60 of the antenna 40*a* and a gain pattern 62 of the antenna 40*b*. As shown, the antenna gain pattern 60 extends outwardly from the motor vehicle 30 and away from the antenna 40*a* and the driver side of the motor vehicle 30. In a similar manner, the antenna gain pattern 62 extends outwardly from the antenna 40*b* and away from the passenger side of the motor vehicle 30. Referring also to FIG. 3, from a top view, the antenna gain patterns 62 and 60 extend likewise in directions away from the passenger and driver sides of the motor vehicle 30.

Thus, the antennas 40*a* and 40*b* are directional in that when the passenger side of the motor vehicle 30 faces the satellite 35, the antenna 40*b* is in a better position to receive the signal from the satellite 35, as opposed to the antenna 40a. Thus, for this heading, the antenna 40b receives the stronger signal. Conversely, when the motor vehicle 30 is oriented so that the driver side of the motor vehicle 30 faces the satellite 35, the antenna 40a is positioned so that the antenna 40a receives a stronger signal from the satellite 35 than the antenna 40b.

Figure 4:
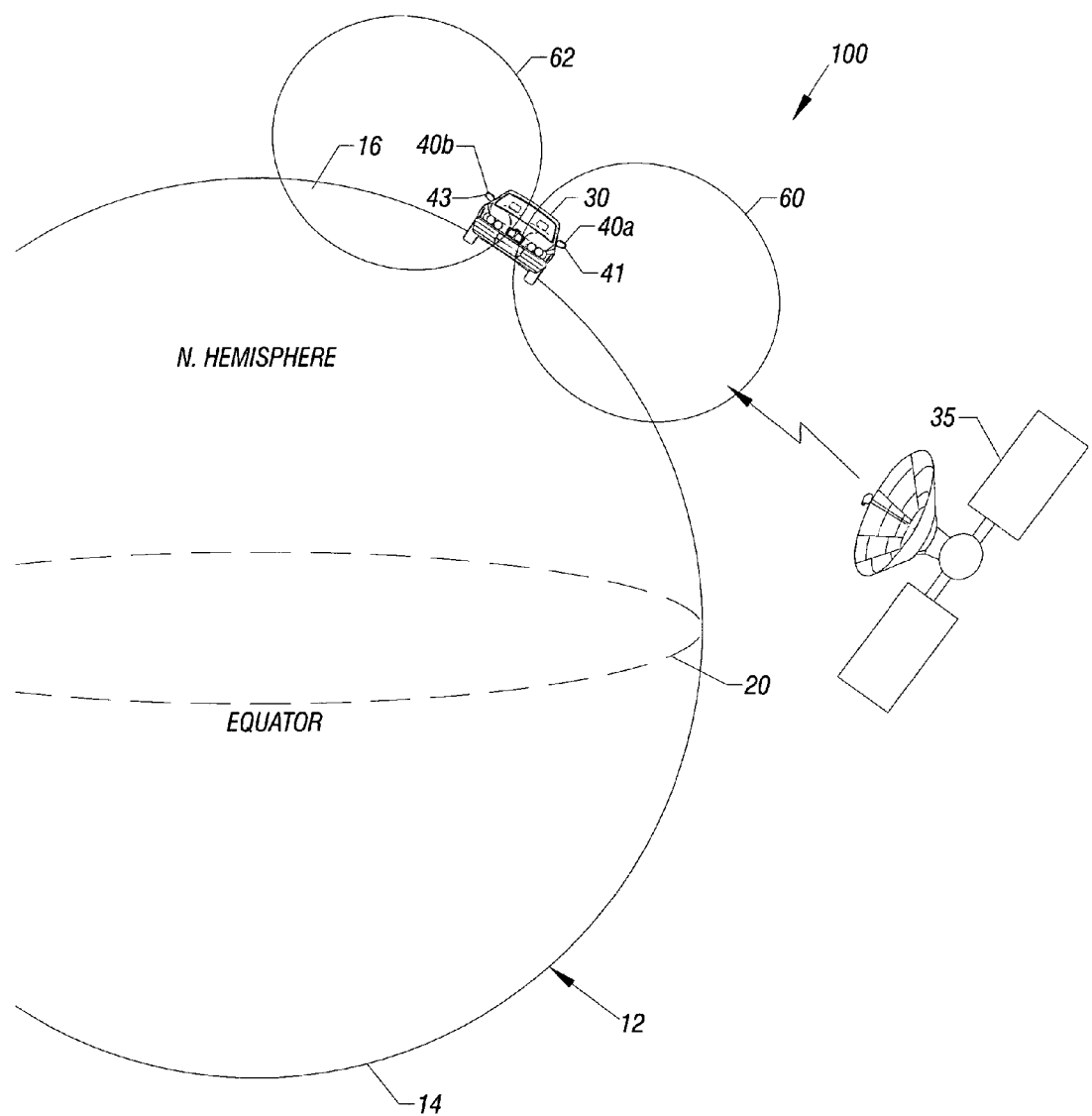

The directional characteristics of the antennas 40a and 40b are illustrated in an environment 100 that is depicted in FIG. 4. Referring to FIG. 4, as in FIG. 1, the motor vehicle 30 is traveling West on the northern hemisphere 16. As depicted in FIG. 4, for this orientation of the motor vehicle 30, the driver side of the motor vehicle 30 faces the satellite 35. Therefore, given the directional characteristics of the antennas 40a and 40b, the antenna 40a, on the driver side of the motor vehicle 30, is in position to receive a stronger signal than the antenna 40b on the passenger side of the motor vehicle 30. Conversely, if the motor vehicle 30 is traveling in an East direction or traveling West on the southern hemisphere 14, then the antenna 40b receives a stronger signal from the satellite 35 than the antenna 40a.

Not only is the signal that is received by the antenna 40a, 40b that faces the satellite 35 stronger, this signal is also generally unobstructed (as compared to the other 40a, 40b antenna) and thus, is less subject to reflective and multipath effects.

Figure 5:
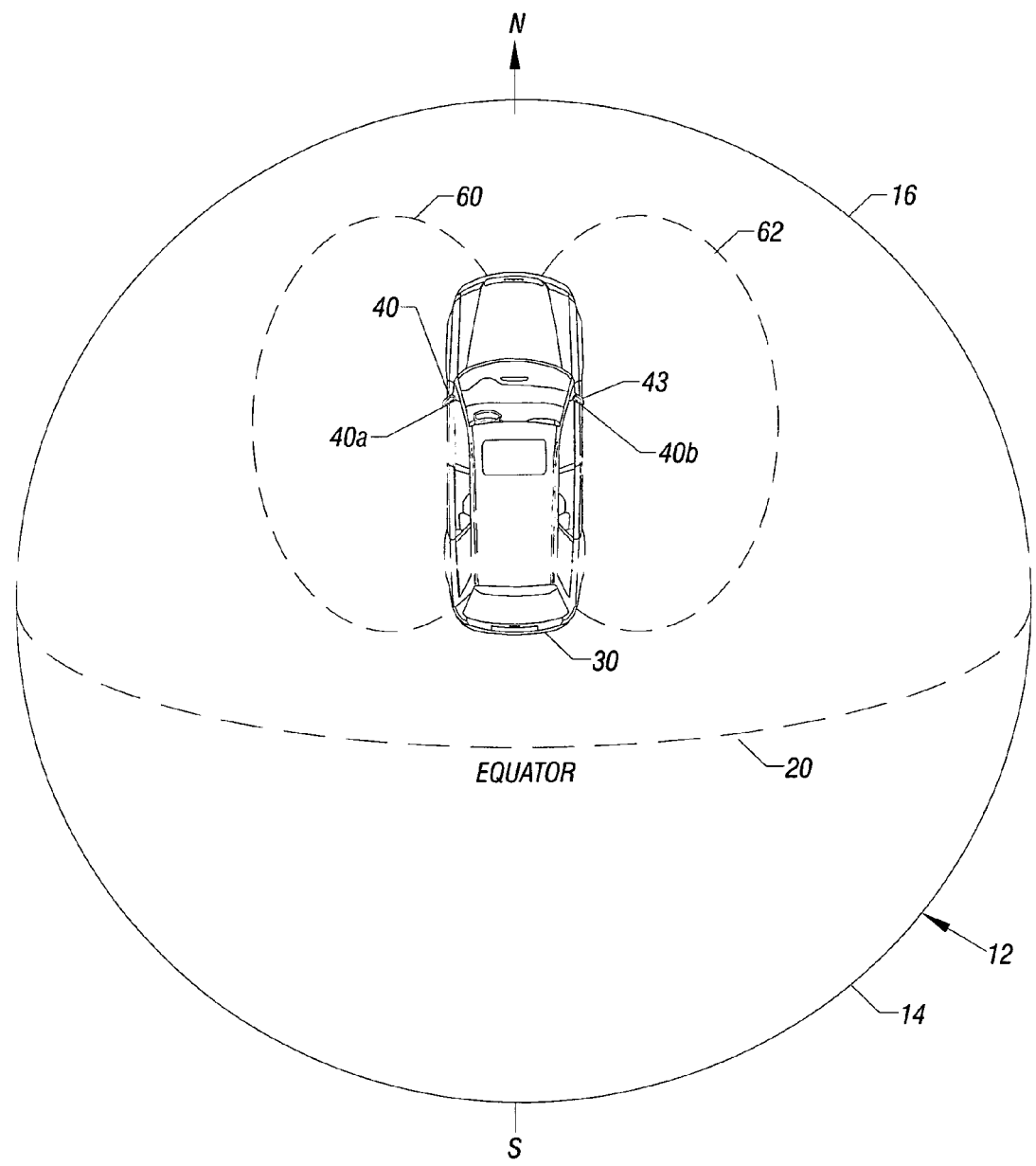

Some headings of the motor vehicle 30 position the vehicle 30 so that either antenna 40a or 40b receives a strong signal from the satellite. For example, referring to FIG. 5, when the motor vehicle 30 has a North heading, both of the antennas 40a and 40b receive equally strong signals from the satellite 35. The same is true when the motor vehicle 30 has a South heading. This effect applies regardless of whether the motor vehicle 30 is in the northern hemisphere 16 or the southern hemisphere 14.

Figure 6:
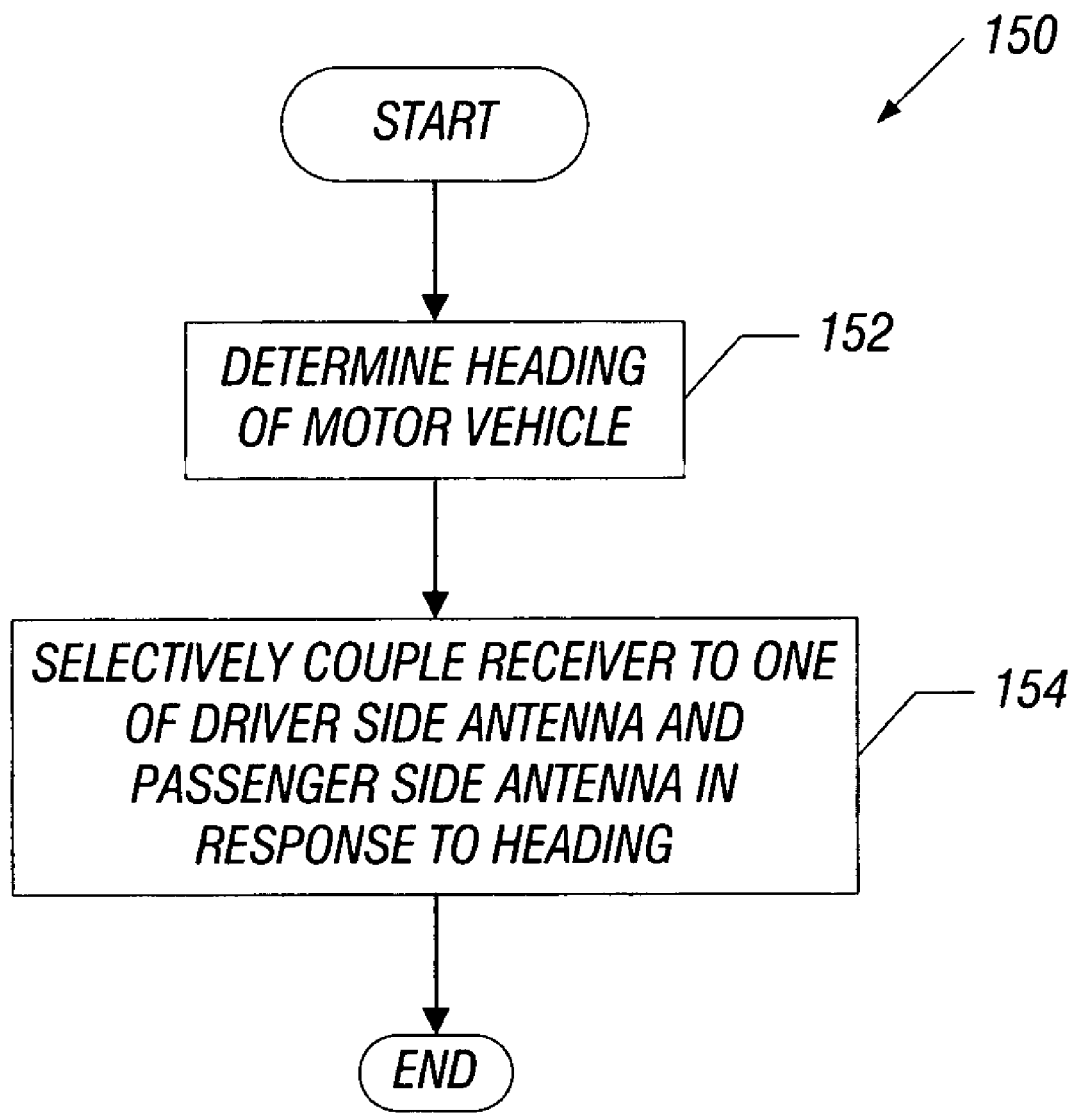
FIGS. 6 and 7 are flow diagrams depicting techniques to select an antenna for connection to a receiver according to embodiments of the invention.

Referring to FIG. 6, thus, in accordance with some embodiments of the invention, a technique 150 for receiving a satellite signal in a vehicle includes determining (block 152) the heading of the vehicle. One of the driver side antenna 40a and the passenger side antenna 40b is coupled to the satellite receiver in response to the heading. Therefore, referring also to FIG. 4, when the motor vehicle 30 is oriented toward the West (assuming the motor vehicle 30 is on the northern hemisphere 16), the technique 150 includes coupling the antenna 40a to the satellite receiver. Conversely, when the motor vehicle 30 is oriented toward East, the technique 150 includes coupling the antenna 40b to the satellite receiver. The non-selected antenna 40a, 40b is not connected to the satellite receiver, but rather, the non-selected antenna 40a, 40b is electrically isolated from the satellite receiver. Due to the above-described arrangement, the vehicle orientation, and not such effects as multipath reflections, determine which antenna 40a or 40b is coupled to the satellite receiver. Therefore, demodulation of the satellite signal for purposes of determining which antenna 40a, 40b provides better a carrier-to-noise (C/N) ratio is not needed. Furthermore, the heading-switched diversity that is described herein only requires a single satellite receiver, as opposed to a full diversity receiver that is continuously connected to two antennas.

In some embodiments of the invention, the hemisphere (northern or southern) on which the motor vehicle 30 is driven is assumed so that if the motor vehicle 30 travels West, the driver side antenna 40a is connected to the receiver, and if the motor vehicle 30 is driven East, the antenna 40b is coupled to the satellite receiver. The connections are the opposite if the motor vehicle 30 is on the southern hemisphere for these same headings.

Figure 7:
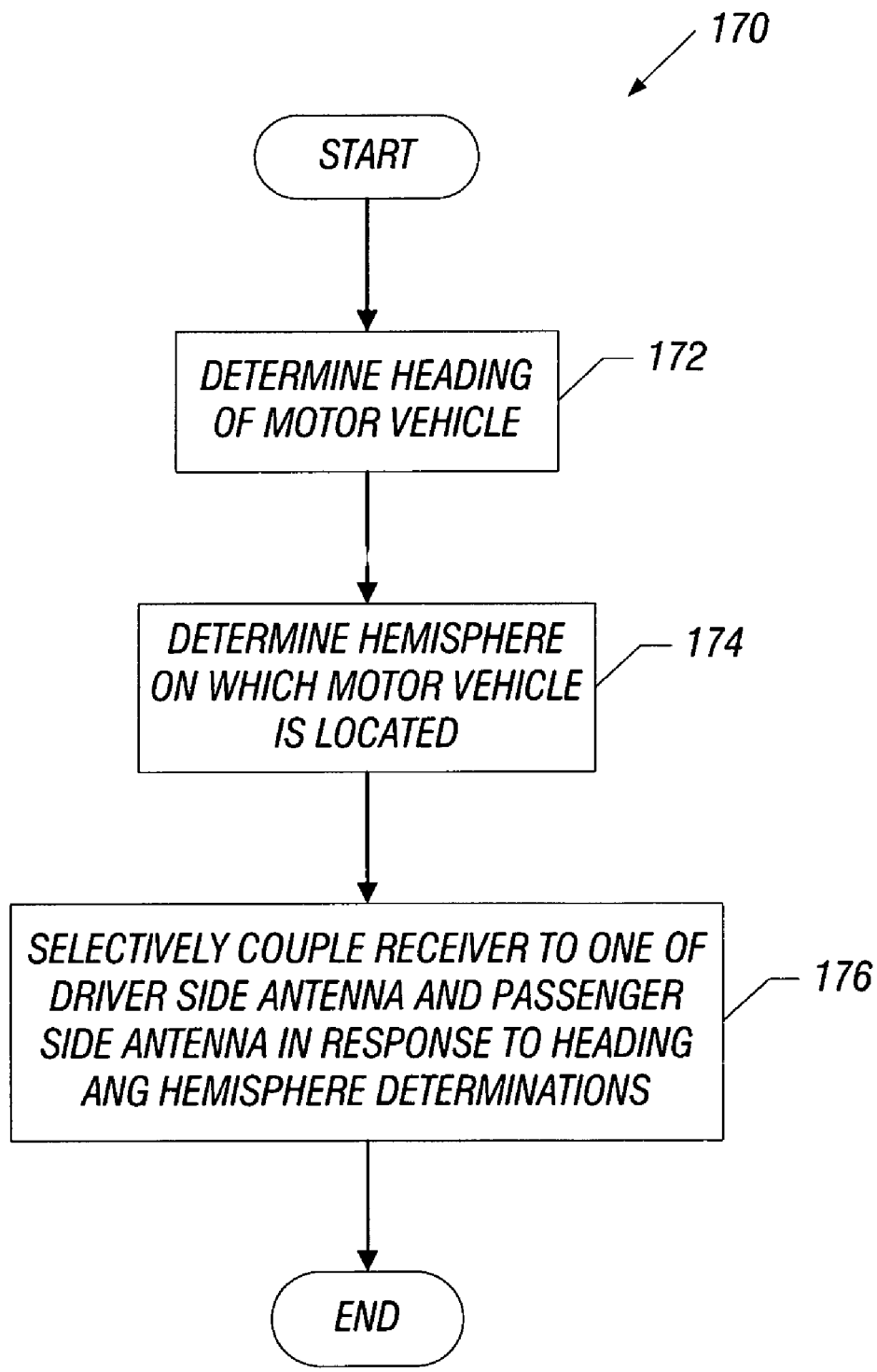

However, in other embodiments of the invention, the hemisphere on which the motor vehicle 30 is located may also be used (in addition to the heading) for purposes of determining which antenna 40a, 40b to which the satellite receiver is coupled. Thus, for these embodiments of the invention, the specific hemisphere is not assumed. In this regard, FIG. 7 depicts a technique 170 that includes determining (block 172) the heading of the motor vehicle 30 and determining (block 174) the hemisphere on which the motor vehicle 30 is located. The determination of the hemisphere may be based on one of several different inputs, such as the input from a global positioning satellite (GPS) receiver that supplies an indication of the global position of the motor vehicle 30, data supplied (via button entry, for example) by a user of the motor vehicle, etc. The technique 170 includes selectively coupling the satellite receiver to one of the driver side antenna and the passenger side antenna in response to the heading and hemisphere determinations, as depicted in block 176.

Figure 8:
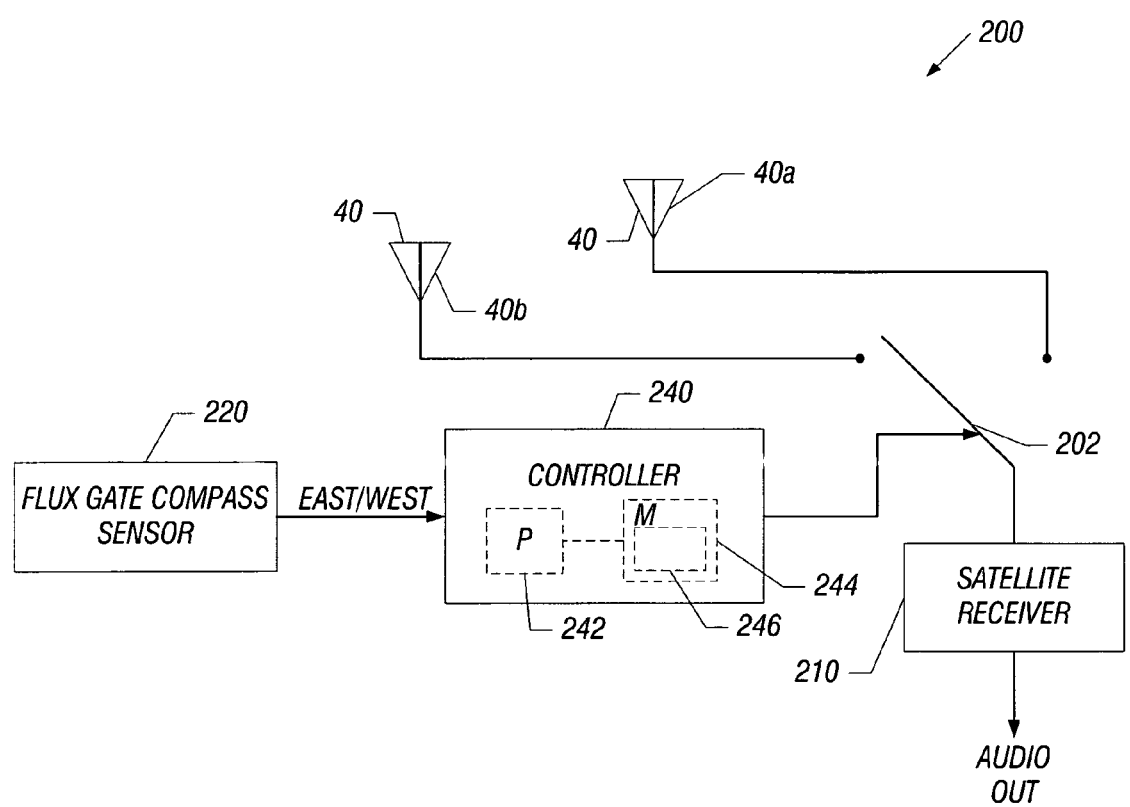
FIGS. 8 and 9 are schematic diagrams of satellite receiver systems according to embodiments of the invention.

Referring to FIG. 8, in some embodiments of the invention, the motor vehicle 30 may include a satellite radio receiver system 200. The satellite receiver system 200 is adapted to receive a satellite signal from a satellite, and the satellite signal includes multiple radio channels. Thus, a satellite receiver 210 (of the receiver system 200) demodulates the satellite signal to provide a choice of multiple radio programs to a driver or passenger in the motor vehicle, in some embodiments of the invention. The satellite signal that demodulated by the satellite receiver 210 is either received from the antenna 40a or the antenna 40b, depending on the heading of the vehicle. The receiver system 200 includes, for example, a flux gate compass sensor 220 that provides an indication of the heading of the motor vehicle 30.

More specifically, in some embodiments of the invention, the compass sensor 220 may provide a signal (called EAST/WEST) that indicates (via its logical state, for example) whether the motor vehicle 30 is oriented East or West. For example, if the EAST/WEST signal is asserted (driven high, for example), the receiver system 200 connects the satellite receiver 210 to the antenna 40b, as an East direction is presumed; and if the EAST/WEST signal is de-asserted (driven low, for example), then the satellite receiver system 200 connects the antenna 40a to the satellite receiver 210. As depicted in FIG. 8, the satellite receiver 210 provides an audio output signal, which may be, for example, a signal that drives a speaker to create audio sound inside the motor vehicle 30.

Depending on the particular embodiment of the invention, the EAST/WEST signal may be asserted if a particular component of the vehicle's heading is in the East direction and de-asserted if the heading has a West component. Thus, for example, if the motor vehicle 30 is oriented in a Northeast direction, the EAST/WEST signal is asserted to indicate travel in the East direction. As another example, if the motor vehicle 30 is oriented in a Southwest direction, the EAST/WEST signal may be de-asserted to indicate the West component and thus, cause connection of the satellite receiver 210 to the antenna 40a.

However, other variations are possible and are within the scope of the appended claims. For example, in some embodiments of the invention, the heading of the motor vehicle 30 may be divided into heading zones that are presumed to be strictly East zones and West zones. For example, in some embodiments of the invention, if the motor vehicle has a heading between "East 45 degrees North" and "East 45 degrees South," then the motor vehicle 30 is presumed to have an East heading (and thus, the EAST/WEST signal is asserted accordingly); and if the motor vehicle 30 has a heading between "West 45 degrees North" and "West 45 degrees South," then the motor vehicle 30 is presumed to have a westward heading (and thus, the EAST/WEST signal is de-asserted accordingly). Otherwise, in some embodiments of the invention, the motor vehicle 30 is presumed either have a North or South heading, which, as described above, allow either the antenna 40a or 40b to be coupled to the satellite receiver 210. Other thresholds, other than the 45 degree delimitation noted above may be used in other embodiments of the invention. Furthermore, in some embodiments of the invention, as described above, if the heading has any East component then the heading presumed East; and likewise, if the heading has any West direction component, then the heading is presumed West. Thus, many variations are possible and are within the scope of the appended claims.

Still referring to FIG. 8, in some embodiments of the invention, the satellite receiver system 200 includes a controller 240 to respond to the EAST/WEST signal and control a switch 202 accordingly. The switch 202 couples one antenna 40a, 40b to the satellite receiver 210 and electrically isolates the other antenna 40a, 40b from the receiver 210 in response to a switch control signal that is provided by the controller 240. In some embodiments of the invention, the controller 240 includes a processor (one or more microprocessors or microcontrollers, depending on the particular embodiment of the invention) that is coupled to a memory 244 of the controller 240. In some embodiments of the invention, the memory 244 may store, for example, instructions 246 that, when executed by the processor 242, cause the processor 242 to respond to the EAST/WEST signal and control the switch 202 in accordance with the techniques that are disclosed herein.

Figure 9:
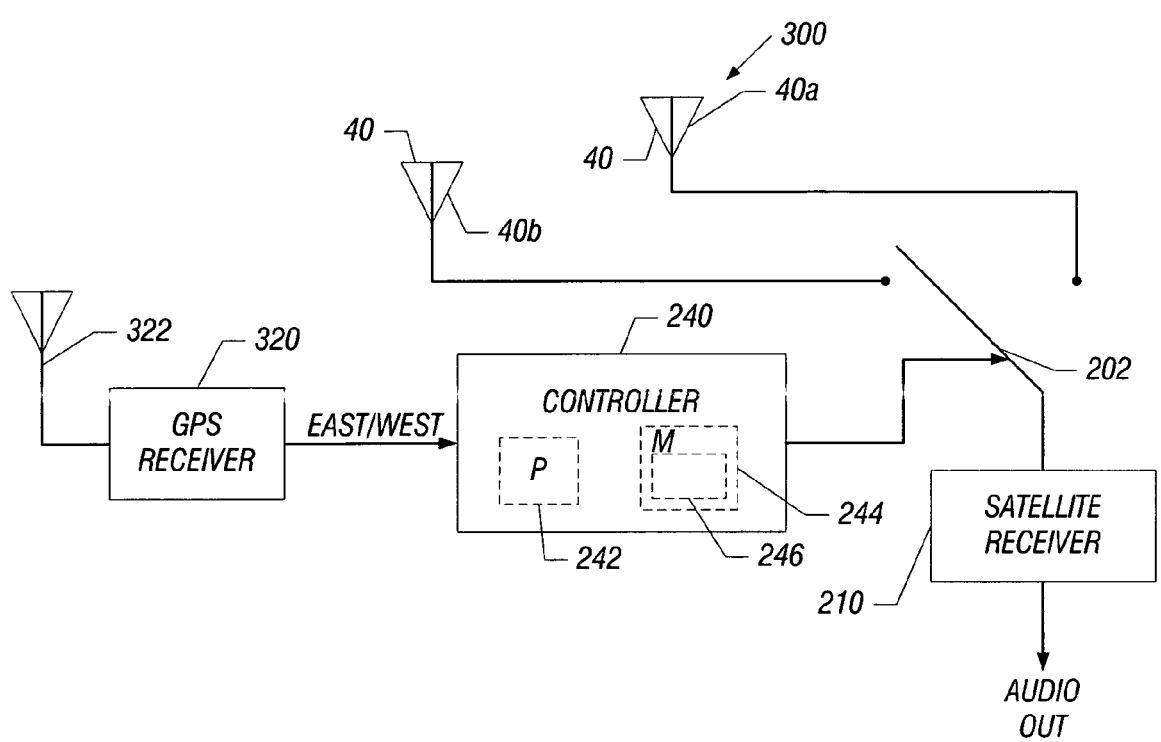

The satellite receiver system 200 depicts the use of a flux gate compass sensor for purposes of determining the heading of the motor vehicle 30. However, in other embodiments of the invention, other devices may be used for purposes of determining the heading of the motor vehicle. For example, referring to FIG. 9, in some embodiments of the invention, a satellite receiver 300 may be used. The satellite receiver system 300 has a similar design to the satellite receiver system 200, with the exception that the flux gate compass sensor 220 is replaced by a global positioning satellite (GPS) receiver 320. The GPS receiver 320 is coupled to a GPS antenna 322. The GPS receiver 320 receives a signal from a GPS satellite for purposes of determining a heading of the motor vehicle 30. In response to the determined heading, the GPS receiver 320 provides the EAST/WEST signal.

To summarize, a technique of selectively coupling a receiver to an antenna in response to a heading of a vehicle has been described herein. Although an automobile is one type of "vehicle" that is used herein to illustrate embodiments of the invention, in the context of this application, the term "vehicle" applies to all land-based (automobiles, trucks, sport utility vehicles, commercial transport vehicles, etc.), air-based and marine-based forms of personal and commercial transportation.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    determining a heading of a vehicle, the heading neither being due East nor due West;
    classifying the determined heading as being due East or due West; and
    based on the classification, connecting a receiver of the vehicle to one of a first antenna associated with a due East heading and a second antenna associated with a due West heading.

2. The method of claim 1, further comprising:
    using a signal from a compass sensor to indicate the heading.

3. The method of claim 1, further comprising:
    using a signal from a global positioning satellite to indicate the heading.

4. The method of claim 1, wherein the first antenna is associated with one of a passenger side a driver side of the vehicle and the second antenna is associated with the other of the driver side of the vehicle and the passenger side of the vehicle.

5. The method of claim 1, wherein vehicle comprises a motor vehicle.

6. The method of claim 1, further comprising:
    based on the classification, isolating the receiver from the first or second antenna to which the receiver is not connected.

7. The method of claim 1, further comprising:
    connecting the receiver based on a global hemisphere on which the vehicle is located.

8. The method of claim 1, wherein the classifying comprises determining whether the heading has an East component or a West component.

9. A receiver comprising:
    a switch; and
    a controller to:
        determine a heading of a vehicle, the heading being neither due East nor due West,
        classify the determined heading as being due East or due West, and
        based on the classification, operating the switch to connect the receiver to one of a first antenna associated with a due East heading and a second antenna associated with a due West heading.

10. The receiver of claim 9, further comprising:
    a compass sensor to provide an indication of the heading.

11. The receiver of claim 9, further comprising:
    a global positioning satellite receiver to provide an indication of the heading.

12. The receiver of claim 9, wherein one of the first and second antennae is associated with a passenger side of the vehicle and the other one of the first and second antennae is associated with a driver side of the vehicle.

13. The receiver of claim 9, wherein the vehicle comprises a motor vehicle.

14. The receiver of claim 9, wherein the controller isolates the first or second antenna not connected from the receiver.

15. The receiver of claim 9, wherein the controller further bases the connection of the receiver on a global hemisphere on which the vehicle is located.

16. A system comprising:
    a first antenna;
    a second antenna;
    a switch; and
    a controller to:
        determine a heading of a vehicle, the heading being neither due East nor due West, classify the determined heading as being due East or due West, and based on the classification, operate the switch to connect the receiver to one of a first antenna associated with a due East heading and a second antenna associated with a due West heading.

17. The system of claim 16, further comprising:
a compass sensor to generate an indication of the heading.

18. The system of claim 16, further comprising:
a global positioning satellite receiver to provide an indication of the heading.

19. The system of claim 16, wherein the first antenna is located on a passenger side of the motor vehicle and the second antenna is located on a driver side of the motor vehicle.

20. The system of claim 16, wherein at least one of the first and second antennas is located inside a sideview mirror housing of the motor vehicle.

21. The system of claim 16, wherein one of the first and second antennas is located in a passenger side sideview mirror housing of the motor vehicle and the other of the first and second antennas is located in a driver side sideview mirror housing of the motor vehicle.

22. The system of claim 16, wherein the controller electrically isolates the first or second antenna not connected from the receiver.

23. An article comprising a computer accessible storage medium storing instructions to when executed cause a processor-based system to:

determine a heading of a vehicle, the heading neither being due East nor due West;

classify the determined heading as being do East or do West; and based on the classification, connect a receiver of the vehicle to one of a first antenna associated with a due East heading and a second antenna associated with a due West heading.

24. The article of claim 23, wherein the antenna is one out of a plurality of antennas selected by the controller in response to the heading.

25. The article of claim 23, the storage medium storing instructions to cause the processor-based system to when executed use an indication of the heading provided by at least one of a compass sensor and a global positioning satellite receiver.

26. A system comprising:
a first antenna;
a second antenna;
a switch; and
a controller to:

determine a heading of a vehicle, the heading being neither due East nor due West, classify the determined heading as being due East or due West, and based on the classification, operate the switch to connect the satellite receiver to one of a first antenna associated with a due East heading and a second antenna associated with a due West heading.

27. The system of claim 26, wherein the satellite receiver comprises a satellite radio receiver and the signal comprises multiple radio channels.

28. The system of claim 26, further comprising:
a compass sensor to generate an indication of the heading.

29. The system of claim 26, further comprising:
a global positioning satellite receiver to provide an indication of the heading.

30. The system of claim 26, wherein the satellite receiver demodulates the satellite signal to provide a choice of multiple radio programs.

31. The system of claim 26, wherein the first antenna is located on a passenger side of the motor vehicle and the second antenna is located on a driver side of the motor vehicle.

32. The system of claim 26, wherein the first antenna is located inside a passenger side sideview mirror housing of the motor vehicle and the second antenna is located inside a driver side sideview mirror housing of the motor vehicle.

33. The system of claim 26, wherein the controller isolates the first or second antenna that is connected to the receiver.

* * * * *

UNITED STATES PATENT AND TRADEMARK OFFICE
CERTIFICATE OF CORRECTION

| | | |
|---|---|---|
| PATENT NO. | : 7,221,319 B2 | Page 1 of 1 |
| APPLICATION NO. | : 11/000696 | |
| DATED | : May 22, 2007 | |
| INVENTOR(S) | : Charles D. Thompson | |

It is certified that error appears in the above-identified patent and that said Letters Patent is hereby corrected as shown below:

<u>Column 6</u>:
Line 18, "side a driver" should be --side and a driver--.

Signed and Sealed this

Twenty-fourth Day of July, 2007

JON W. DUDAS
*Director of the United States Patent and Trademark Office*